United States Patent
Park et al.

(10) Patent No.: US 9,329,316 B2
(45) Date of Patent: May 3, 2016

(54) WIRE GRID POLARIZER AND LIQUID CRYSTAL DISPLAY PANEL AND LIQUID CRYSTAL DISPLAY DEVICE HAVING THE SAME

(71) Applicants: SAMSUNG ELECTRONICS CO., LTD., Suwon-si, Gyeonggi-do (KR); SAMSUNG DISPLAY CO., LTD., Yongin, Gyeonggi-Do (KR)

(72) Inventors: Joon-yong Park, Suwon-si (KR); Jung-gun Nam, Seoul (KR); Byung-hoon Kim, Seongnam-si (KR); Dae-young Lee, Seoul (KR); Sung-hoon Lee, Seoul (KR); Gug-rae Jo, Asan-si (KR); Atsushi Takakuwa, Hwaseong-si (KR); Suk Gyu Hahm, Gyeongsangbuk-do (KR)

(73) Assignees: SAMSUNG ELECTRONICS CO., LTD. (KR); SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/470,002

(22) Filed: Aug. 27, 2014

(65) Prior Publication Data
US 2015/0062500 A1 Mar. 5, 2015

(30) Foreign Application Priority Data
Aug. 27, 2013 (KR) .......................... 10-2013-0101996

(51) Int. Cl.
*G02F 1/1335* (2006.01)
*G02B 5/30* (2006.01)

(52) U.S. Cl.
CPC ........ *G02B 5/3058* (2013.01); *G02F 1/133536* (2013.01); *G02B 2207/107* (2013.01); *G02F 2001/133548* (2013.01)

(58) Field of Classification Search
CPC ............ G02B 5/3058; G02B 2207/107; G02F 1/133536; G02F 2001/133548
See application file for complete search history.

(56) References Cited

U.S. PATENT DOCUMENTS

| | | | |
|---|---|---|---|
| 5,772,905 | A | 6/1998 | Chou |
| 6,243,199 | B1 | 6/2001 | Hansen et al. |
| 6,288,840 | B1 | 9/2001 | Perkins et al. |
| 6,665,119 | B1 | 12/2003 | Kurtz et al. |
| 6,696,220 | B2 | 2/2004 | Bailey et al. |
| 6,900,881 | B2 | 5/2005 | Sreenivasan et al. |
| 7,090,716 | B2 | 8/2006 | McMackin et al. |
| 7,150,622 | B2 | 12/2006 | Choi et al. |
| 7,316,554 | B2 | 1/2008 | Choi et al. |
| 7,573,546 | B2 | 8/2009 | Lee et al. |
| 7,648,767 | B2 | 1/2010 | Fu et al. |
| 7,670,127 | B2 | 3/2010 | Heidari |
| 7,670,758 | B2 | 3/2010 | Wang et al. |
| 7,738,056 | B2 | 6/2010 | Tsujimura et al. |
| 7,807,087 | B2 | 10/2010 | Park et al. |

(Continued)

FOREIGN PATENT DOCUMENTS

| KR | 100824782 B1 | 4/2008 |
|---|---|---|
| KR | 101319444 B1 | 10/2013 |

*Primary Examiner* — Anne Hines
*Assistant Examiner* — Jose M Diaz
(74) *Attorney, Agent, or Firm* — Cantor Colburn LLP

(57) ABSTRACT

A wire grid polarizer includes: a substrate; a wire grid layer disposed on the substrate and including a plurality of wire patterns arranged at regular intervals; and a passivation layer disposed on the substrate to cover the wire grid layer and including a material having a refractive index less than 1.4.

17 Claims, 5 Drawing Sheets

(56) References Cited

U.S. PATENT DOCUMENTS

| | | |
|---|---|---|
| 7,965,357 B2 | 6/2011 | Van De Witte et al. |
| 8,025,833 B2 | 9/2011 | Kodama et al. |
| 8,027,086 B2 | 9/2011 | Guo et al. |
| 8,066,930 B2 | 11/2011 | Sreenivasan et al. |
| 8,087,920 B2 | 1/2012 | Cho et al. |
| 8,152,511 B2 | 4/2012 | Xu et al. |
| 2008/0041816 A1 | 2/2008 | Choo et al. |
| 2008/0143638 A1* | 6/2008 | Kim .................. G02F 1/133528 345/6 |
| 2008/0149488 A1 | 6/2008 | Lee et al. |
| 2009/0155583 A1 | 6/2009 | Xu et al. |
| 2010/0079706 A1 | 4/2010 | Kim et al. |
| 2010/0103517 A1 | 4/2010 | Davis et al. |
| 2010/0277786 A1* | 11/2010 | Anderson ............... B60R 1/088 359/247 |
| 2011/0222002 A1 | 9/2011 | Lee |
| 2015/0028296 A1* | 1/2015 | Jeong .................. G02B 5/3058 257/40 |

* cited by examiner

WIRE GRID POLARIZER AND LIQUID CRYSTAL DISPLAY PANEL AND LIQUID CRYSTAL DISPLAY DEVICE HAVING THE SAME

CROSS-REFERENCE TO RELATED APPLICATIONS

This application claims to Korean Patent Application No. 10-2013-0101996, filed on Aug. 27, 2013, and all the benefits accruing therefrom under 35 U.S.C. §119, the content of which in its entirety is herein incorporated by reference.

BACKGROUND

1. Field

The disclosure relates to a wire grid polarizer, a liquid crystal display ("LCD") panel including the wire grid polarizer, and a LCD device including the LCD panel.

2. Description of the Related Art

In general, a liquid crystal display ("LCD") device includes an LCD panel on which an image is displayed using light transmittance of liquid crystal and a backlight unit that provides light to the LCD panel. In such an LCD device, the image is displayed by controlling light transmittance of a liquid crystal layer, and polarized light needs to be incident on the liquid crystal layer. To this end, a polarizer that changes unpolarized light emitted from the backlight unit into polarized light is disposed on the LCD panel. Technology that uses a wire grid polarizer as a polarizer for the LCD panel has been recently developed.

The wire grid polarizer typically has a structure in which a plurality of wire patterns is periodically disposed on a transparent substrate at regular intervals. A reflection type wire grid polarizer has splitting characteristics of reflecting polarized light parallel to a direction of the wire patterns and transmitting polarized light perpendicular to the direction of the wire patterns. Thus, the reflection type wire grid polarizer may be used as the polarizer for the LCD panel, and polarized light reflected from the wire grid polarizer may be incident/reflected on the backlight unit and may be reused. Thus, light efficiency may be improved compared to a conventional absorption type polarization film.

SUMMARY

Provided are exemplary embodiments of a wire grid polarizer, a liquid crystal display ("LCD") panel including the wire grid polarizer, and a LCD device including the liquid crystal display panel.

Additional features will be set forth in part in the description which follows and, in part, will be apparent from the description, or may be learned by practice of the presented embodiments.

According to an embodiment of the invention, a wire grid polarizer includes: a substrate; a wire grid layer disposed on the substrate and including a plurality of wire patterns arranged at regular intervals; and a passivation layer disposed on the substrate to cover the wire grid layer and including a material having a refractive index less than about 1.4

In an embodiment, the passivation layer may include a material having transmittance of 95% or greater with respect to visible light.

In an embodiment, the passivation layer may include an oxide, and a plurality of pores may be defined in the passivation layer.

In an embodiment, the passivation layer may include an oxide, and a plurality of nanopores may be defined in the passivation layer.

In an embodiment, a volume fraction of the nanopores within the passivation layer may be 10% or greater.

In an embodiment, the passivation layer may further include silicon.

In an embodiment, the wire grid polarizer may further include a planarization layer disposed on the passivation layer.

In an embodiment, the wire patterns of the wire grid layer may be arranged with a pitch of about ¼ or less of a wavelength of light to be polarized.

In an embodiment, the wire grid layer may have a fill factor of about 0.3 or greater. Each of the wire patterns of the wire grid layer may have a cross-section having an aspect ratio of about 1 or greater.

In an embodiment, the wire grid polarizer may be a reflection type polarizer or an absorption type polarizer.

According to another embodiment of the invention, a liquid crystal display ("LCD") panel includes: a wire grid polarizer which changes polarization of light incident thereon; a thin film transistor layer disposed on the wire grid polarizer; a liquid crystal layer disposed on the thin film transistor layer; and a polarizer disposed on the liquid crystal layer, where the wire grid polarizer includes: a first substrate, which is transparent; a wire grid layer disposed on the first substrate and including a plurality of wire patterns arranged at regular intervals; and a passivation layer disposed on the first substrate to cover the wire grid layer and including a material having a refractive index less than 1.4.

In an embodiment, The LCD panel may further include a second substrate which is transparent and disposed on the polarizer.

According to another embodiment of the invention, an LCD device includes: a backlight unit; and an LCD panel which is disposed at an upper part of the backlight unit and displays an image using light emitted from the backlight unit, where the LCD panel includes: a wire grid polarizer which changes polarization of light emitted from the backlight unit; a thin film transistor layer disposed on the wire grid polarizer; a liquid crystal layer disposed on the thin film transistor layer; and a polarizer disposed on the liquid crystal layer, and where the wire grid polarizer includes: a first substrate, which is transparent; a wire grid layer disposed on the first substrate and including a plurality of wire patterns arranged at regular intervals; and a passivation layer disposed on the first substrate to cover the wire grid layer and including a material having a refractive index less than about 1.4.

BRIEF DESCRIPTION OF THE DRAWINGS

These and/or other features will become apparent and more readily appreciated from the following description of the embodiments, taken in conjunction with the accompanying drawings, in which.

DETAILED DESCRIPTION

Figure 1:
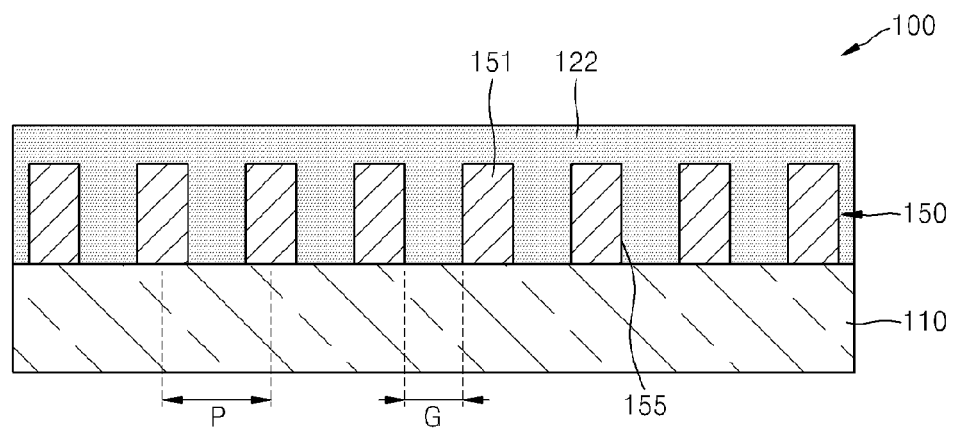
FIG. 1 is a cross-sectional view of an embodiment of a wire grid polarizer according to of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described in detail with reference to the accompanying drawings.

Figure 2:
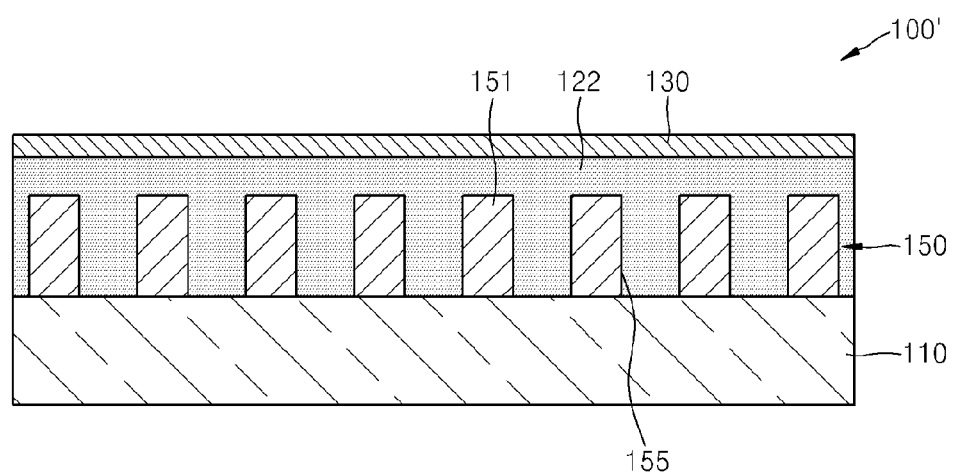
FIG. 2 is a cross-sectional view of an alternative embodiment of a wire grid polarizer according to the invention.

FIG. 1 is a cross-sectional view of an embodiment of a wire grid polarizer according to the invention, and FIG. 2 is a cross-sectional view of an alternative embodiment of a wire grid polarizer according to the invention.

Referring to FIG. 1, an embodiment of a wire grid polarizer 100 includes a substrate 110, a wire grid layer 150 disposed on the substrate 110, and a passivation layer 122 disposed on the substrate 110 to cover the wire grid layer 150. In such an embodiment, the wire grid layer 150 may be entirely covered by the passivation. The substrate 110 may be a transparent substrate. In one embodiment, for example, the substrate 110 may be a glass substrate, but embodiments of the invention are not limited thereto. The wire grid layer 150 having a polarization characteristic is disposed on the substrate 110. The wire grid layer 150 includes a plurality of wire patterns 151 periodically arranged on a top surface of the substrate 110 at regular intervals. Thus, gaps 155 having widths G may be defined between the wire patterns 151, which is disposed substantially parallel to each other.

In an embodiment, the wire grid polarizer 100 may be a reflection type wire grid polarizer. In such an embodiment, the wire grid polarizer 100 may reflect polarized light substantially parallel to a direction (e.g., the extending direction) of the wire patterns 151 and may transmit polarized light substantially perpendicular to the direction of the wire patterns 151. In an embodiment, the wire patterns 151 may include a metal material, such as aluminum (Al), titanium (Ti), chromium (Cr), silver (Ag), gold (Au), nickel (Ni), or molybdenum (Mo), for example, but embodiments of the invention are not limited thereto. In an alternative embodiment, the wire grid polarizer 100 may be an absorption type wire grid polarizer. In such an embodiment, the wire grid polarizer 100 may absorb polarized light substantially parallel to the direction of the wire patterns 151 and may transmit polarized light substantially perpendicular to the direction of the wire patterns 151. In such an embodiment, the wire patterns 151 may include an alloy of the above-described metal materials or an absorption type non-metal material, for example, a chromium oxide.

The wire patterns 151 may be arranged on the substrate 110 with a pitch P and an aspect ratio. In one embodiment, for example, the pitch P of the wire patterns 151 arranged on the substrate 110 may be approximately ¼ or less of a wavelength of incident light, for example, visible light. A cross-section of each of the wire patterns 151 may have an aspect ratio of about 1 or greater. Here, the aspect ratio of a cross-section of a wire pattern 151 may be defined as a ratio of longest edge length to shortest edge length or a ratio of height to width shown in FIGS. 1 and 2. The wire grid layer 150 including the wire patterns 151 may have a fill factor of about 0.3 or greater, for example, but embodiments of the invention are not limited thereto. Here, the fill factor may be defined as a ratio of a width of a wire pattern to a sum of the width of the wire pattern and the width G of the gap. In an embodiment, the above-described pitch P, the aspect ratio and the fill factor may be modified in various ways.

The passivation layer 122 is disposed on the substrate 110 to cover the wire grid layer 150. The passivation layer 122 may protect the structure of the wire grid layer 150 and may prevent an electrical effect on a thin film transistor ("TFT") that may be disposed on the passivation layer 122. In such an embodiment, the passivation layer 122 may insulate the TFT from the wire grid layer 150. The passivation layer 122 may include a material that may transmit visible light. In one embodiment, for example, the passivation layer 122 may include a material having transmittance of about 95% or greater with respect to the visible light, but embodiments of the invention are not limited thereto. In an embodiment, where a silicon thin film transistor may be disposed on the passivation layer 122, the passivation layer 122 may include a heat-resisting material that may withstand a high-temperature process and a material having suppressed outgassing to allow a vacuum process to be performed.

In an embodiment, the passivation layer 122 may include a material having a low refractive index. In such an embodiment, the passivation layer 122 may include a material having a refractive index less than about 1.4. In an embodiment, the passivation layer 122 may include or be formed of an oxide including a plurality of pores (not shown). In such an embodiment, the passivation layer 122 may include or be formed of an oxide including a plurality of nanopores (not shown). The nanopores may have sizes of about several nanometers (nm); however, embodiments of the invention are not limited thereto. In one embodiment, for example, air may be filled in the nanopores. The refractive index of the passivation layer 122 may further decrease as the volume of the nanopores within the passivation layer 122 increases. In an embodiment, a volume fraction of the nanopores within the passivation layer 122 may be about 10% or greater, for example; however, embodiments of the invention are not limited thereto.

The relationship between the refractive index of the passivation layer 122 and the volume fraction of the nanopores therein is represented by the following Equation 1.

Equation 1:

$$\frac{1}{(n\_{passivation\ layer})^2} = \frac{1 - Vf\_{nano\ porosity}}{(n\_{Matrix})^2} + \frac{Vf\_{nano\ porosity}}{(n\_{nano\ porosity})^2}$$

In Equation 1, $n\_{passivation\ layer}$, $n\_{Matrix}$ and $n\_{nano\ porosity}$ denote a refractive index of the passivation layer 122, a refractive index of a material (for example, an oxide) used to form the passivation layer 122 and a refractive index of a nanopores, respectively, and $Vf\_{nano\ porosity}$ denotes a volume fraction of the nanopores. Referring to Equation 1, as the volume fraction of the nanopores increases, the refractive index of the passivation layer 122 decreases.

The passivation layer 122 may include or be formed of an oxide including silicon. In one embodiment, for example, the passivation layer 122 may include $SiO_2$ or SiOC, but embodiments of the invention are not limited thereto. The passivation layer 122 may be provided or formed on the substrate 110 to cover the wire grid layer 150 through a spin on glass ("SOG") process or a deposition process, such as chemical vapor deposition ("CVD").

As illustrated in FIG. 2, the wire grid polarizer 100' may further include a planarization layer 130 disposed on the passivation layer 122. In an embodiment, where the passivation layer 122 has large surface roughness, the planarization layer 130 may provide a planar surface on the passivation layer 122 such that a thin film transistor layer (see 540 of FIG. 9) may be stably disposed on the passivation layer 122. In an embodiment, where the passivation layer 122 is formed of a porous material having a low refractive index, the passivation layer 122 may have large surface roughness, the planarization layer 130 may be disposed on the passivation layer 122, and the thin film transistor layer (see 540 of FIG. 9) may be effectively provided on the planarization layer 130. In an embodiment, the planarization layer 130 may include or be formed of a silicon nitride, for example, but embodiments of the invention are not limited thereto. The planarization layer 130 may include a material that has a high light transmittance and is suitable for a high-temperature process for manufacturing a TFT, or the like on the passivation layer 122.

In an embodiment, the passivation layer 122 that covers the wire grid layer 150 is formed of the low refractive index material including a plurality of pores such that optical characteristics including transmittance, an extinction ratio and a luminance gain of a wire grid polarizer 100' may be improved.

FIGS. 3 through 8 are graphs showing experimental results showing optical characteristics of an embodiment of a wire grid polarizer, which are improved as the refractive index of a passivation layer material decreases. In FIGS. 3 through 8, a silicon oxide was used as the passivation layer material, and the refractive index of the passivation layer material varied by adjusting the volume of pores within the silicon oxide. A reflection type wire grid polarizer is used as the wire grid polarizer.

Figure 3:
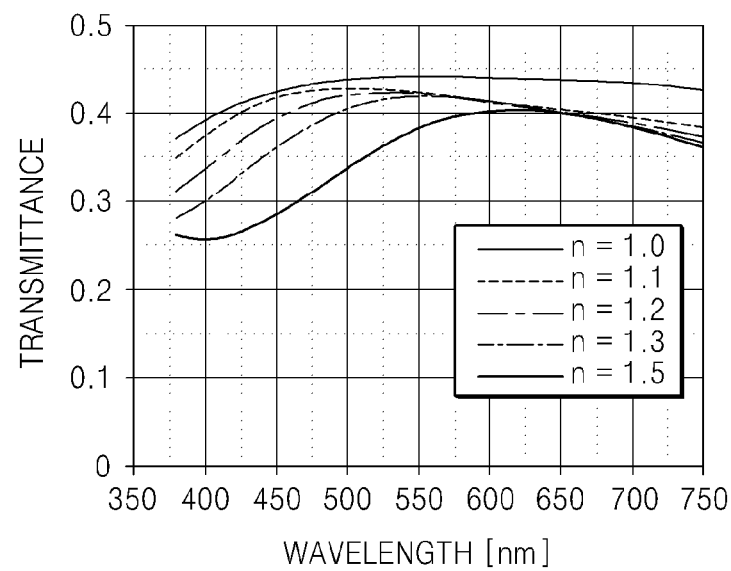
FIG. 3 is a graph of transmittance of a wire grid polarizer versus a wavelength of visible light, in which transmittance varies according to a refractive index of a passivation layer material of the wire grid polarizer.
Figure 4:
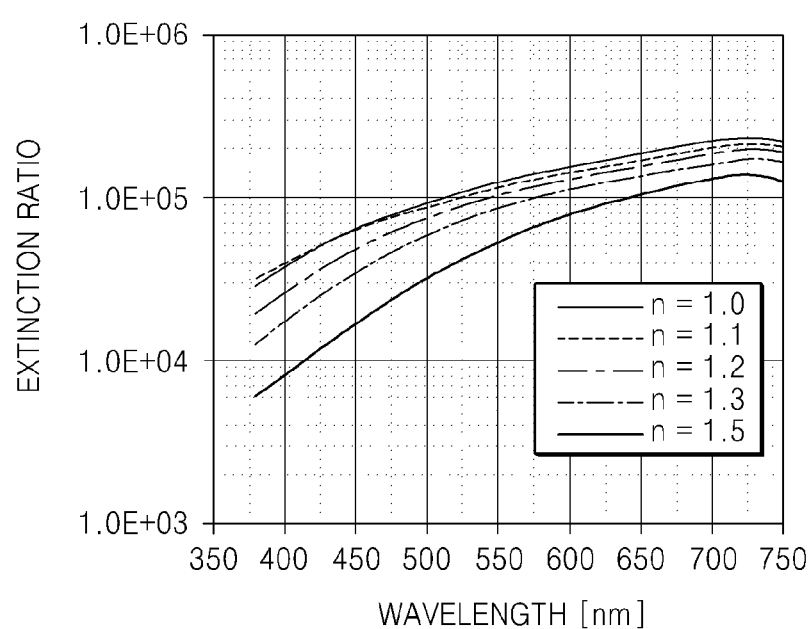
FIG. 4 is a graph of an extinction ratio of the wire grid polarizer versus a wavelength of visible light, in which transmittance varies according to the refractive index of the passivation layer material of the wire grid polarizer.

FIG. 3 is a graph showing transmittance of a wire grid polarizer versus a wavelength of visible light, in which transmittance varies according to a refractive index of the passivation layer material of the wire grid polarizer. Referring to FIG. 3, as the refractive index of the passivation layer material decreases in a wavelength range of visible light of about 600 nm or less, transmittance may increase. FIG. 4 is a graph showing an extinction ratio of the wire grid polarizer versus a wavelength of visible light, in which transmittance varies according to the refractive index of the passivation layer material of the wire grid polarizer. Referring to FIG. 4, as the refractive index of the passivation layer material decreases, the extinction ratio of the wire grid polarizer may increase.

Figure 5:
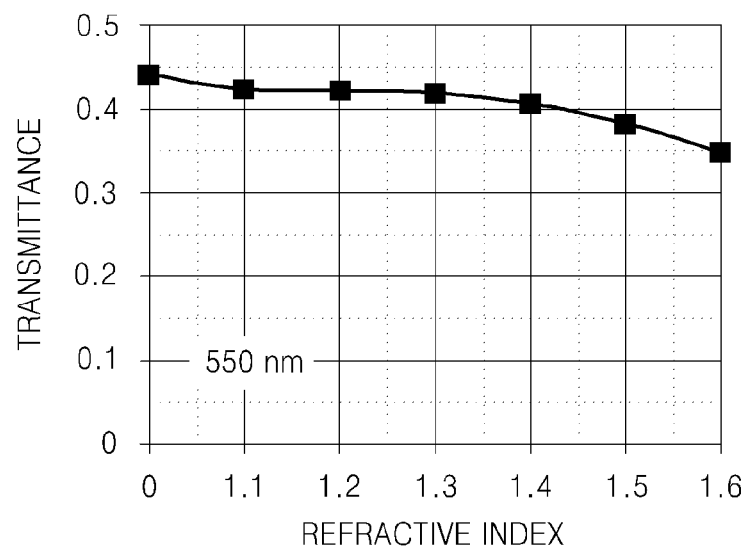
FIG. 5 is a graph of transmittance of the wire grid polarizer versus the refractive index of the passivation layer material of the wire grid polarizer when visible light having a wavelength of 550 nanometers (nm) is incident on the wire grid polarizer.
Figure 6:
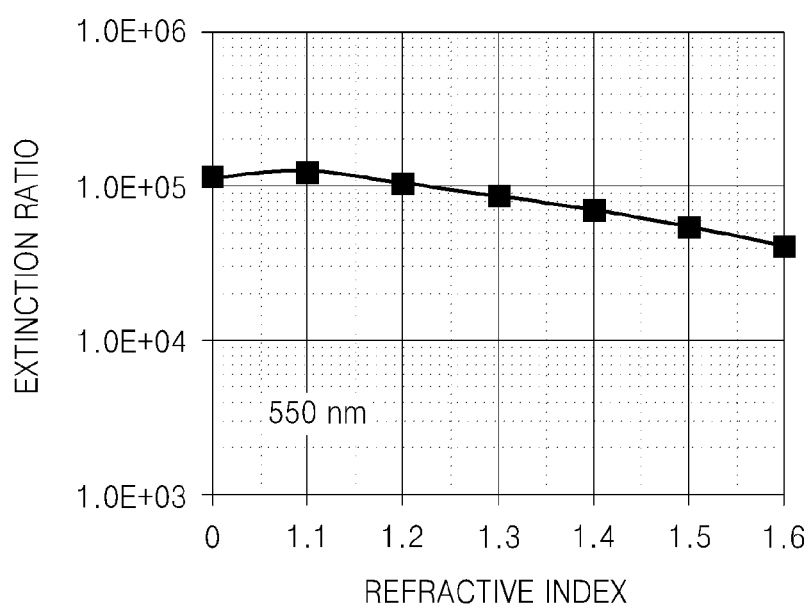
FIG. 6 is a graph of an extinction ratio of the wire grid polarizer versus the refractive index of the passivation layer material of the wire grid polarizer when visible light having a wavelength of 550 nm is incident on the wire grid polarizer.

FIG. 5 is a graph showing transmittance of the wire grid polarizer versus the refractive index of the passivation layer material of the wire grid polarizer when visible light having a wavelength of 550 nm is incident on the wire grid polarizer. FIG. 6 is a graph showing an extinction ratio of the wire grid polarizer versus the refractive index of the passivation layer material of the wire grid polarizer when visible light having a wavelength of 550 nm is incident on the wire grid polarizer. Referring to FIGS. 5 and 6, transmittance and the extinction ratio of the wire grid polarizer decrease as the refractive index of the passivation layer material increases in regard to incidence of visible light of 550 nm.

Figure 7:
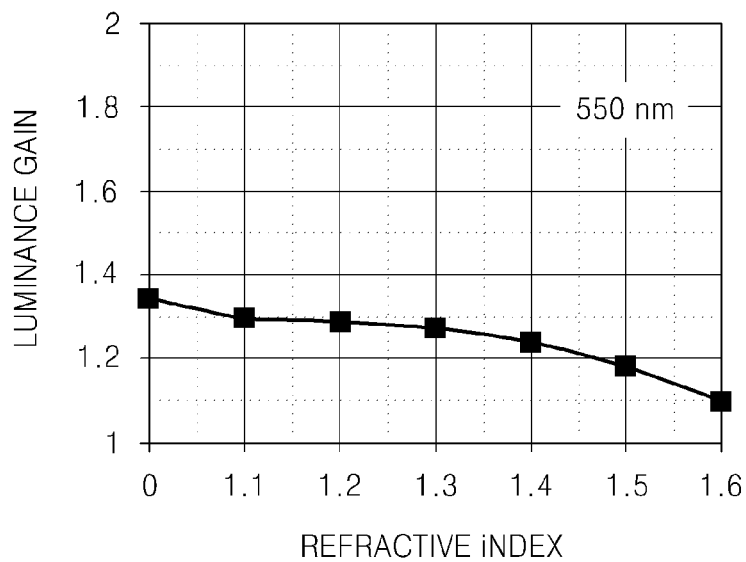
FIG. 7 is a graph of a luminance gain of the wire grid polarizer versus the refractive index of the passivation layer material of the wire grid polarizer when visible light having a wavelength of 550 nm is incident on the wire grid polarizer, compared to an absorption type polarizer.
Figure 8:
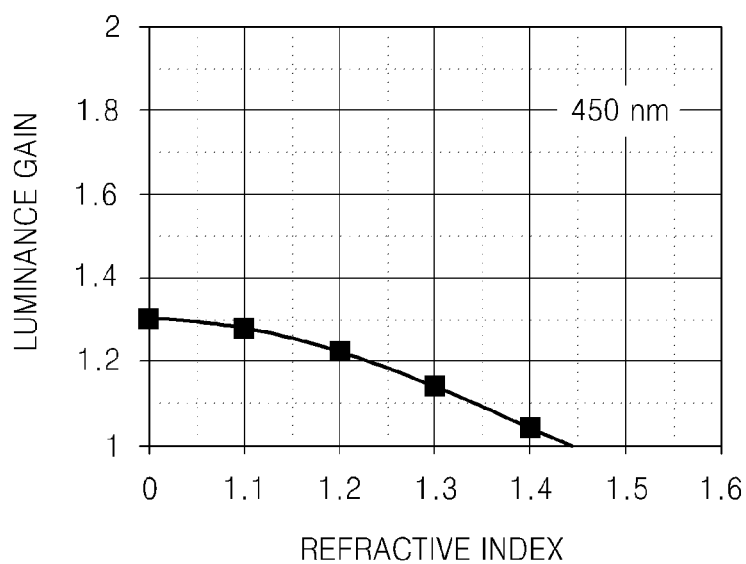
FIG. 8 is a graph of a luminance gain of the wire grid polarizer versus the refractive index of the passivation layer material of the wire grid polarizer when visible light having a wavelength of 450 nm is incident on the wire grid polarizer, compared to the absorption type polarizer.

FIG. 7 is a graph showing a luminance gain of the wire grid polarizer versus the refractive index of the passivation layer material of the wire grid polarizer when visible light having a wavelength of 550 nm is incident on the wire grid polarizer, compared to an absorption type polarizer. FIG. 8 is a graph showing a luminance gain of the wire grid polarizer versus the refractive index of the passivation layer material of the wire grid polarizer when visible light having a wavelength of 450 nm is incident on the wire grid polarizer, compared to the absorption type polarizer. In FIGS. 7 and 8, a polyvinyl alcohol ("PVA") polarization film is used as the absorption type polarizer to be compared.

Referring to FIGS. 7 and 8, as the refractive index of the passivation layer material increases, the luminance gain compared to the absorption type polarizer decreases. In particular, as the refractive index of the passivation layer material in a region of visible light having a wavelength of 450 nm increases, the luminance gain compared to the absorption type polarizer may decrease rapidly. As the refractive index of the passivation layer material decreases, transmittance, the extinction ratio and the luminance gain compared to the absorption type polarizer may be improved.

Table 1 shows the result of optical characteristics of the wire grid polarizer according to the refractive index of the passivation layer material. Here, a silicon oxide was used as the passivation layer material, and the refractive index of the passivation layer material varied by adjusting the volume of the pores within the silicon oxide. In Table 1, Bare WGP, WGP(n=1.4), WGP(n=1.45), WGP(n=1.23) and WGP (n=1.28) represent wire grid polarizers having substantially the same structure as each other except for the passivation layer. Bare WGP is the wire grid polarizer in which only a wire grid layer is disposed on a transparent substrate. Bare WGP may be manufactured by arranging wire patterns having a line width of about 70 nm and a height of about 200 nm on the transparent substrate at intervals of about 70 nm. WGP (n=1.4) and WGP(n=1.45) are conventional wire grid polarizers including the passivation layer, in which refractive indexes of the passivation layer material are 1.4 and 1.45, respectively. WGP(n=1.23) and WGP(n=1.28) are exemplary embodiments of the wire grid polarizer including the passivation layer, according to the invention, in which refractive indexes of the passivation layer material are 1.23 and 1.28, respectively.

TABLE 1

|  | Bare WGP | WGP (n = 1.4) | WGP (n = 1.45) | WGP (n = 1.23) | WGP (n = 1.28) |
| --- | --- | --- | --- | --- | --- |
| Transmittance Efficiency (%) | 100 | 97.29 | 87.06 | 97.88 | 97.96 |
| Polarization Degree Efficiency (%) | 100 | 98.70 | 99.11 | 99.98 | 99.90 |

Referring to Table 1, when transmittance efficiency and polarization degree efficiency of Bare WGP are defined as 100% and 100%, respectively, an embodiment of the wire grid polarizers according to of the invention, e.g., WGP (n=1.23) and WGP(n=1.28), has improved transmittance efficiency and polarization degree efficiency compared to a conventional wire grid polarizer, e.g., WGP(n=1.4) and WGP (n=1.45). Thus, in an embodiment of the invention, a material having a low refractive index less than about 1.4 is used as the passivation layer material, such that transmittance efficiency and polarization degree efficiency of the wire grid polarizer may be improved.

Figure 9:
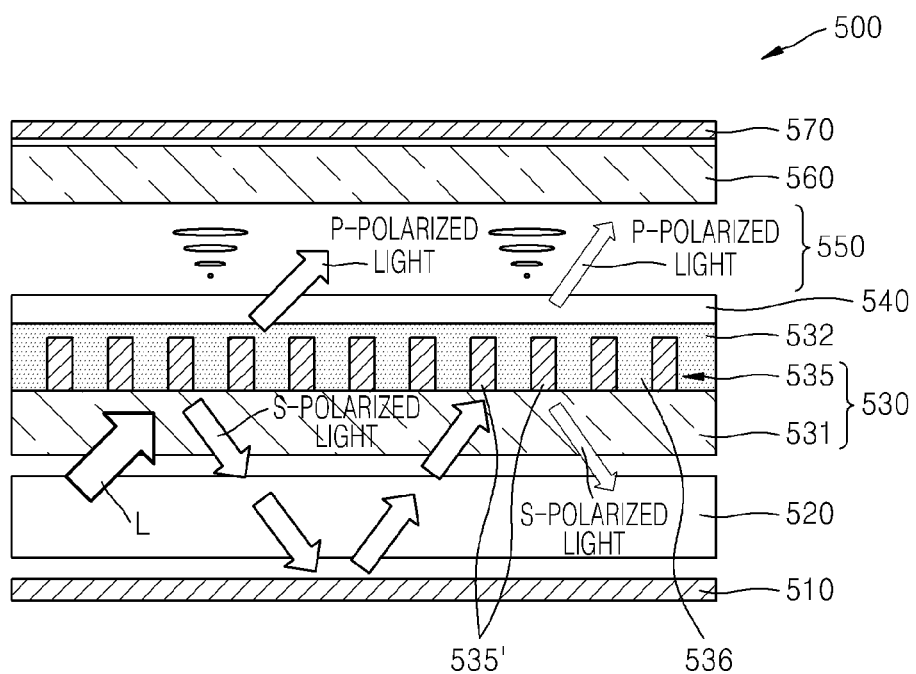
FIG. 9 is a cross-sectional view of an embodiment of a liquid crystal display device according to the invention.

The wire grid polarizer 100 illustrated in FIG. 1 may be applied to a liquid crystal display ("LCD") device. FIG. 9 is a cross-sectional view of an embodiment of an LCD device 500 according to the invention. The wire grid polarizer of the LCD shown in FIG. 9 is substantially the same as the embodiments of the wire grid polarizer described above, and any repetitive detailed description thereof will hereinafter be omitted or simplified.

Referring to FIG. 9, an embodiment of a LCD device 500 includes a backlight unit 520 and an LCD panel disposed above the backlight unit 520, e.g., at an upper portion of the backlight unit 520. The backlight unit 520 may emit light in a wavelength region, for example, visible light. An image is displayed on the LCD panel using the light emitted from the backlight unit 520.

The LCD panel may include a wire grid polarizer 530, a thin film transistor layer 540, a liquid crystal layer 550 and a polarizer 570, which are sequentially disposed on the backlight unit 520. The wire grid polarizer 530 changes polarization of light L emitted from the backlight unit 520. The wire grid polarizer 530 includes a transparent first substrate 531, a wire grid layer 535 disposed on a first layer 531, and a passivation layer 532 disposed on the first substrate 531 to cover a wire grid layer 535. The wire grid layer 535 may be provided by arranging a plurality of wire patterns 535' on the first substrate 531 at regular intervals.

In an embodiment, the wire grid polarizer 530 may be a reflection type wire grid polarizer. In such an embodiment, the wire grid polarizer 530 may reflect polarized light parallel to an extending direction of the wire patterns 535' and may transmit polarized light perpendicular to the extending direction of the wire patterns 535'. The wire patterns 535' may be substantially uniformly disposed on the first substrate 531 with a pitch and an aspect ratio.

The passivation layer 532 is disposed on the first substrate 531 to cover the wire grid layer 535. In an embodiment, the passivation layer 532 may include a material having a low refractive index. In such an embodiment, the passivation layer 532 may include a material having a refractive index less than about 1.4. In an embodiment, the passivation layer 532 having the low refractive index may include an oxide including a plurality of pores. In such an embodiment, the passivation layer 532 may include an oxide including a plurality of nanopores (not shown). The nanopores may have sizes of about several nanometers, but embodiments of the present invention are not limited thereto. In one embodiment, for example, air may be filled in the nanopores. In an embodiment, a volume fraction of the nanopores within the passivation layer 532 may be about 10% or greater, for example, but embodiments of the invention are not limited thereto. The passivation layer 532 may include an oxide including silicon. Although not shown in FIG. 9, a planarization layer (see 130 of FIG. 2) may also be further disposed on the passivation layer 532. The planarization layer may include a material that has a high light transmittance and is suitable for a high-temperature process for manufacturing a TFT or the like, on the passivation layer 532.

The thin film transistor layer 540 is disposed on the passivation layer 532 of the wire grid polarizer 530. The thin film transistor layer 540 drives the liquid crystal layer 550 and may include a TFT and a driving unit. In an embodiment, the TFT may be an amorphous silicon TFT, for example, but the invention is not limited thereto. The liquid crystal layer 550 is disposed on the thin film transistor layer 540. The liquid crystal layer 550 functions as a light shutter and transmits or blocks polarized light transmitted through the wire grid polarizer 530 by driving of the TFT.

A second substrate 560, which is transparent, may be disposed at an upper part of the liquid crystal layer 550, and the polarizer 570 may be disposed on the second substrate 560. In an embodiment, the polarizer 570 may be an absorption type polarization film. However, embodiments of the invention are not limited thereto. In an embodiment, as shown in FIG. 9, the polarizer 570 is disposed at an upper part of the second substrate 560, but in an alternative embodiment, the polarizer 570 may be disposed at a lower part of the second substrate 560. A reflector 510 that reflects incident light may be disposed at a lower part of the backlight unit 520.

In an embodiment of the LCD device 500 having the structure described above, after light L emitted from the backlight unit 520 is polarized by the wire grid polarizer 530, for example, S-polarized light is reflected toward the backlight unit 520, and P-polarized light is transmitted through the wire grid polarizer 530. The reflected S-polarized light is transmitted by the backlight unit 520, is again reflected by the reflector 510 and then is mixed with the light L emitted from the backlight unit 520 and is re-incident on the wire grid polarizer 530. Here, P-polarized light is linearly polarized light parallel to a plane of incidence (e.g., a boundary surface between the first substrate 531 and the wire grid layer 535), and S-polarized light is linearly polarized light perpendicular to the plane of incidence.

As described above, in an embodiment of the LCD device 500 according to the invention, the wire grid polarizer 530 having improved transmittance and polarization characteristics is employed such that luminance and light efficiency of the LCD device may be improved. In such an embodiment, polarized light reflected from the wire grid polarizer 530 may be incident on the backlight unit 520 and may be reused, such that light efficiency may be further improved. As described above, in an embodiment, the wire grid polarizer 530 is the reflection type wire grid polarizer, but not being limited thereto. In an alternative embodiment, the wire grid polarizer 530 may be an absorption type wire grid polarizer.

As described above, according to embodiments of the invention, a wire grid polarizer includes a passivation layer that includes a transparent refractive index material and is disposed to cover a wire grid layer on a substrate such that optical characteristics of the wire grid polarizer may be improved. The wire grid polarizer may be suitable or effectively used for a process of manufacturing a TFT including a high-temperature process and a vacuum process. Also, in an embodiment of an LCD device that employs the wire grid polarizer having improved optical characteristics, luminance and light efficiency of the LCD may be improved, and polarized light reflected from the wire grid polarizer may be incident on a backlight unit and may be reused such that light efficiency may be further improved.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A wire grid polarizer comprising:
a substrate;
a wire grid layer disposed on the substrate and comprising a plurality of wire patterns arranged at regular intervals;
a passivation layer disposed on the substrate to cover the wire grid layer and comprising a material having a refractive index less than about 1.4; and
a planarization layer disposed on the passivation layer.

2. The wire grid polarizer of claim 1, wherein the passivation layer comprises a material having transmittance of about 95% or greater with respect to visible light.

3. The wire grid polarizer of claim 1, wherein
the passivation layer comprises an oxide, and
a plurality of pores is defined in the passivation layer.

4. The wire grid polarizer of claim 1, wherein
the passivation layer comprises an oxide, and
a plurality of nanopores is defined in the passivation layer.

5. The wire grid polarizer of claim 4, wherein a volume fraction of the nanopores within the passivation layer is about 10% or greater.

6. The wire grid polarizer of claim 3, wherein the passivation layer further comprises silicon.

7. The wire grid polarizer of claim 1, wherein the wire patterns of the wire grid layer are arranged with a pitch of about ¼ or less of a wavelength of light to be polarized.

8. The wire grid polarizer of claim 1, wherein the wire grid layer has a fill factor of about 0.3 or greater.

9. The wire grid polarizer of claim 1, wherein each of the wire patterns of the wire grid layer has a cross-section having an aspect ratio of about 1 or greater.

10. The wire grid polarizer of claim 1, wherein the wire grid polarizer is a reflection type polarizer or an absorption type polarizer.

11. A liquid crystal display panel comprising:
a wire grid polarizer which changes polarization of light passing therethrough;
a thin film transistor layer disposed on the wire grid polarizer;
a liquid crystal layer disposed on the thin film transistor layer; and
a polarizer disposed on the liquid crystal layer,
wherein the wire grid polarizer comprises:
a first substrate, which is transparent;
a wire grid layer disposed on the first substrate and comprising a plurality of wire patterns arranged at regular intervals;
a passivation layer disposed on the first substrate to cover the wire grid layer and comprising a material having a refractive index less than about 1.4; and a planarization layer disposed on the passivation layer.

12. The liquid crystal display panel of claim 11, wherein the passivation layer comprises an oxide,
a plurality of nanopores is defined in the passivation layer, and
a volume fraction of the nanopores within the passivation layer is about 10% or greater.

13. The liquid crystal display panel of claim 11, further comprising:
a second substrate which is transparent and disposed on the polarizer.

14. A liquid crystal display device comprising:
a backlight unit; and
a liquid crystal display panel which is disposed at an upper part of the backlight unit and displays an image using light emitted from the backlight unit,
wherein the liquid crystal display panel comprises:
a wire grid polarizer which changes polarization of light emitted from the backlight unit;
a thin film transistor layer disposed on the wire grid polarizer;
a liquid crystal layer disposed on the thin film transistor layer; and
a polarizer disposed on the liquid crystal layer, and
wherein the wire grid polarizer comprises:
a first substrate, which is transparent;
a wire grid layer disposed on the first substrate and comprising a plurality of wire patterns arranged at regular intervals;
a passivation layer disposed on the first substrate to cover the wire grid layer and comprising a material having a refractive index less than about 1.4; and
a planarization layer disposed on the passivation layer.

15. The liquid crystal display device of claim 14, further comprising:
a second substrate which is transparent and disposed on the polarizer.

16. The liquid crystal display device of claim 14, wherein the passivation layer comprises an oxide,
a plurality of nanopores is defined in the passivation layer, and
a volume fraction of the nanopores within the passivation layer is about 10% or greater.

17. The liquid crystal display device of claim 14, further comprising:
a reflector disposed at a lower part of the backlight unit.

* * * * *